(12) United States Patent
Kawashiki (10) Patent No.: US 7,432,487 B2
(45) Date of Patent: Oct. 7, 2008

(54) DEVICE FOR CORRECTING OUTPUT OF OPTICAL PICKUP

(75) Inventor: Mitsumasa Kawashiki, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 11/890,799

(22) Filed: Aug. 7, 2007

(65) Prior Publication Data

US 2008/0061215 A1 Mar. 13, 2008

(30) Foreign Application Priority Data

Aug. 8, 2006 (JP) ............................. 2006-215812

(51) Int. Cl.
*G01J 1/20* (2006.01)
*G11B 7/00* (2006.01)
*G02B 5/32* (2006.01)

(52) U.S. Cl. ............ 250/201.5; 369/44.41; 369/112.03; 359/15

(58) Field of Classification Search ... 250/201.1–201.9, 250/202, 204; 369/120, 109.01, 44.11–44.22
See application file for complete search history.

(56) References Cited

U.S. PATENT DOCUMENTS

| 6,256,283 B1 * | 7/2001 | Fukakusa et al. | 369/112.01 |
| 6,256,285 B1 * | 7/2001 | Coombs | 369/112.03 |
| 6,333,818 B1 * | 12/2001 | Miura et al. | 359/618 |
| 6,781,931 B2 * | 8/2004 | Nishi | 369/44.41 |
| 2002/0048233 A1 * | 4/2002 | Ogasawara et al. | 369/44.23 |

FOREIGN PATENT DOCUMENTS

| JP | 7-134831 | 5/1995 |
| JP | 8-335323 | 12/1996 |
| JP | 9-330522 | 12/1997 |
| JP | 10-83541 | 3/1998 |

OTHER PUBLICATIONS

Patent Abstracts of Japan for Japanese Publication No. 09-330522, Publication date Dec. 22, 1997 (1 page).
Patent Abstracts of Japan for Japanese Publication No. 07-134831, Publication date May 23, 1995 (1 page).
Patent Abstracts of Japan for Japanese Publication No. 08-335323, Publication date Dec. 17, 1996 (1 page).
Patent Abstracts of Japan for Japanese Publication No. 10-083541, Publication date Mar. 31, 1998 (1 page).

* cited by examiner

*Primary Examiner*—Georgia Y. Epps
*Assistant Examiner*—Jennifer Bennett
(74) *Attorney, Agent, or Firm*—Osha Liang LLP (57) ABSTRACT

Light receiving elements for receiving a + one-dimensional light divided into four are arranged in the vicinity of a light receiving part for receiving the zero-dimensional light. Some light receiving elements configure the light receiving elements of a first group for receiving the + one-dimensional light forming a focus on the front side of the light receiving surface, and the other light receiving elements configure the light receiving elements of a second group for receiving the + one-dimensional light forming a focus on the rear side of the light receiving surface. A correction value is calculated based on a difference in the outputs of the light receiving elements belonging to the first group and a difference in the outputs of the light receiving elements belonging to the second group, and the focus error signal is corrected using the correction value.

3 Claims, 6 Drawing Sheets

DEVICE FOR CORRECTING OUTPUT OF OPTICAL PICKUP

BACKGROUND OF THE INVENTION

The present invention relates to a device for correcting a focus error signal obtained from an output of an optical pickup.

The optical pickup used in recordation and reproduction of an optical disc includes a light emitting element, an objective lens for collecting a light projected from the light emitting element on the optical disc, and a light receiving unit for receiving the light reflected by the optical disc. A focus error signal and a tracking error signal are detected based on an output of the light receiving unit, where focus control and tracking control by a servo are performed based on the respective signal.

Japanese Laid-Open Patent Publication No. 9-330522 discloses an optical disc device including a plurality of light receiving elements arranged in a planar form, where the device reads information recorded on the optical disc using a zero-dimensional light diffracted by a hologram, and detects the focus error signal and the tracking error signal using a ± one-dimensional light. In this document, a plurality of light receiving elements for detecting the focus error signal based on + one-dimensional light and a plurality of light receiving elements for detecting the tracking error signal based on − one-dimensional light are arranged on both sides of an optical spot position of a zero-dimensional light. Furthermore, the relevant document discloses a technique of accurately detecting out-of-focus even if an unnecessary zero-dimensional light has entered the light receiving elements by averaging a reflected light amount signal and comparing the same with a predetermined threshold value.

However, in the device described in this document, since the + one-dimensional light and the − one-dimensional light are used to detect the focus error signal and the tracking error signal the position of the light receiving element must be set accurately with respect to the respective one-dimensional light, which makes positional accuracy difficult to obtain. Thus, variation occurs in the detected signals and high accuracy servo control becomes difficult to perform. Furthermore, in the present document, a circuit for averaging the reflected light amount signal is required to remove the influence of stray light, which makes the circuit configuration complicating and leads to increase in cost.

Japanese Laid-Open Patent Publication No. 7-134831 discloses a technique of arranging an ambient light receiving region in the vicinity of a signal detection light receiving region of an optical detector in the optical pickup and calculating the difference between a signal obtained at the signal detection light receiving region and a signal obtained at the ambient light receiving region to remove a DC offset of the servo signal generated by the stray light. However, in the device described in this document, the ambient light receiving region must be arranged in addition to the signal detection light receiving region, which increases the surface area of the light receiving unit thereby inhibiting miniaturization of the optical pickup and increasing the cost.

Japanese Laid-Open Patent Publication No. 8-335323 discloses a technique of adjusting respective output balances of four light receiving cells configuring the light receiving element with a variable gain amplifier to remove a leakage signal of the track that mixes with the focus error signal, and stabilize the focus control. However, the arrangement of the light receiving elements in this document differs from the arrangement of the light receiving elements of the present invention to be hereinafter described, and the means for removing the leakage signal is completely different from that of the present invention.

Japanese Laid-Open Patent Publication No. 10-83541 discloses a technique of calculating the difference and the sum of the signal retrieved from a divided light receiving surface at each light receiving unit in which a light receiving surface is divided in half, equalizing a level of the difference signal of each light receiving unit with a respective sum signal, and combining each difference signal to generate the focus error signal to remove offset caused by an unbalance in amount of light of the divided light and variance in light receiving sensitivity at the light receiving unit. However, this document does not disclose countermeasures for the stray light and the arrangement of the light receiving elements is different from the arrangement of the light receiving elements of the present invention.

SUMMARY OF THE INVENTION

Figure 2:
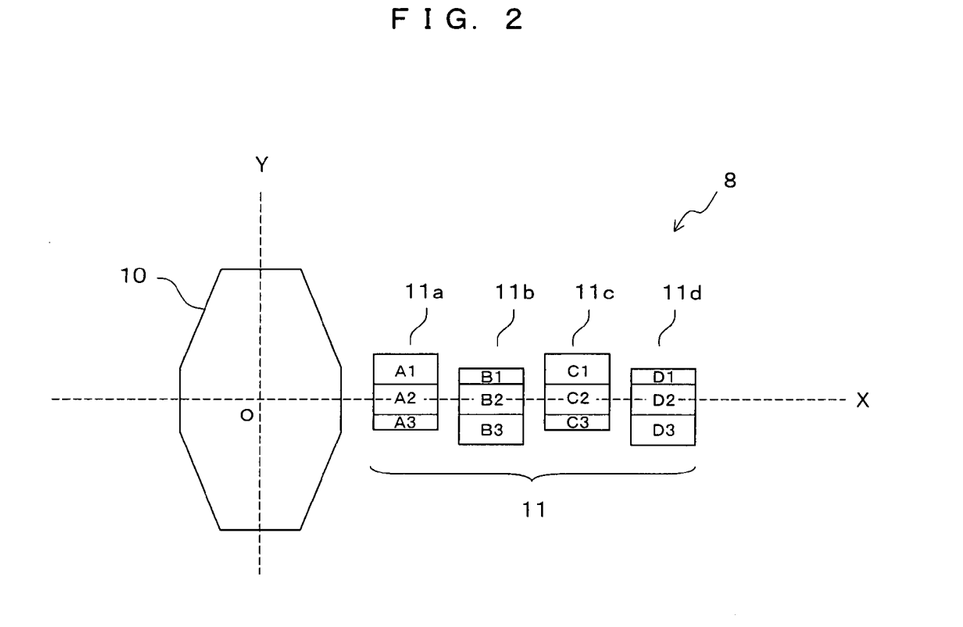
FIG. 2 is a view showing a configuration of a light receiving unit.

An optical pickup capable of obtaining all signals necessary in focus control and tracking control using only + one-dimensional light has recently been proposed in place of a method of using the + one-dimensional light for the detection of the focus error signal and − one-dimensional light for the detection of the tracking error signal as described in aforesaid Japanese Laid-Open Patent Publication No. 9-330522. As shown in FIG. 2, such optical pickup includes a first light receiving part 10 for receiving zero-dimensional light, and a second light receiving part 11 including four light receiving elements 11a to 11d for receiving the + one-dimensional light divided into four by a light dividing element such as hologram. Each light receiving element 11a to 11d of the second light receiving part 11 is arrayed in a direction parallel to a radial direction (X direction) of the optical disc, and is respectively configured by three light receiving cells A1 to A3, B1 to B3, C1 to C3, and D1 to D3 divided in a direction (Y direction) orthogonal to the arraying direction.

It is an object of the present invention to enable the optical pickup described above to obtain an accurate focus error signal without offset even if the zero-dimensional light leaks into the second light receiving part 11 as stray light.

The present invention relates to a device for correcting an output from an optical pickup including a light emitting element, an objective lens for collecting a light projected from the light emitting element on an optical disc, and a light receiving unit for receiving the light reflected by the optical disc; the device including a light dividing element for dividing the light reflected by the optical disc; a detection means for detecting a focus error signal based on an output of the light receiving unit; and a correction means for correcting the focus error signal detected in the detection means. The light receiving unit includes a first light receiving part for receiving a zero-dimensional light divided by the light dividing element and a second light receiving part, arranged in the vicinity of the first light receiving part, for receiving a plurality of one-dimensional lights (+ one-dimensional light or − one-dimensional light) divided by the light dividing element. The second light receiving part includes a plurality of light receiving elements arrayed in a direction parallel to a radial direction of the optical disc and respectively adapted to receive the a plurality of one-dimensional lights, the light receiving elements being divided into a plurality of groups, a pair of light receiving elements for receiving the one-dimensional light having a same focal length belonging to the same group. Each light receiving element is configured by a plurality of light receiving cells divided in a direction orthogonal to the arraying direction. The detection means detects the focus error signal based on the output of the light receiving cells of each light receiving element. The correction means calculates a correction value based on a difference in outputs of the pair of light receiving elements belonging to at least one group, and corrects the focus error signal detected by the detection means based on the correction value.

In the present invention, when the zero-dimensional light leaks into the second light receiving part, a difference is created in the outputs of the pair of light receiving elements for receiving the one-dimensional light having the same focal length, and such difference is obtained to calculate the correction value, whereby the focus error signal is corrected by the correction value to easily remove an offset of the focus error signal.

In the preferred embodiment of the present invention, the correction means calculates the correction value based on a difference in the outputs of the pair of light receiving elements belonging to a group including a light receiving element closest to the first light receiving part. The light receiving element closest to the first light receiving part is influenced the most by the leakage of the zero-dimensional light, and thus the offset of the focus error signal by the zero-dimensional light can be more reliably removed by performing the correction as described above.

In a typical embodiment of the present invention, the second light receiving part includes four light receiving elements for receiving the + one-dimensional light divided by the light dividing element. The light receiving elements are divided into light receiving elements of a first group and light receiving elements of a second group. A pair of light receiving elements for receiving the + one-dimensional light having a first focal length belongs to the first group, and a pair of light receiving elements for receiving the + one-dimensional light having a second focal length belongs to the second group. Each light receiving element is configured by three light receiving cells. The correction means calculates a correction value based on a difference in the outputs of the pair of light receiving elements belonging to the first group and a difference in the outputs of the pair of light receiving elements belonging to the second group, and corrects the focus error signal based on the correction value.

According to the present invention, in the optical pickup in which focus control and tracking control are performed using only one of the ± one-dimensional lights, a stable focus control is performed by preventing a production of offset in the focus error signal caused by the leakage of the zero-dimensional light.

DESCRIPTION OF THE PREFERRED EMBODIMENT

Figure 1:
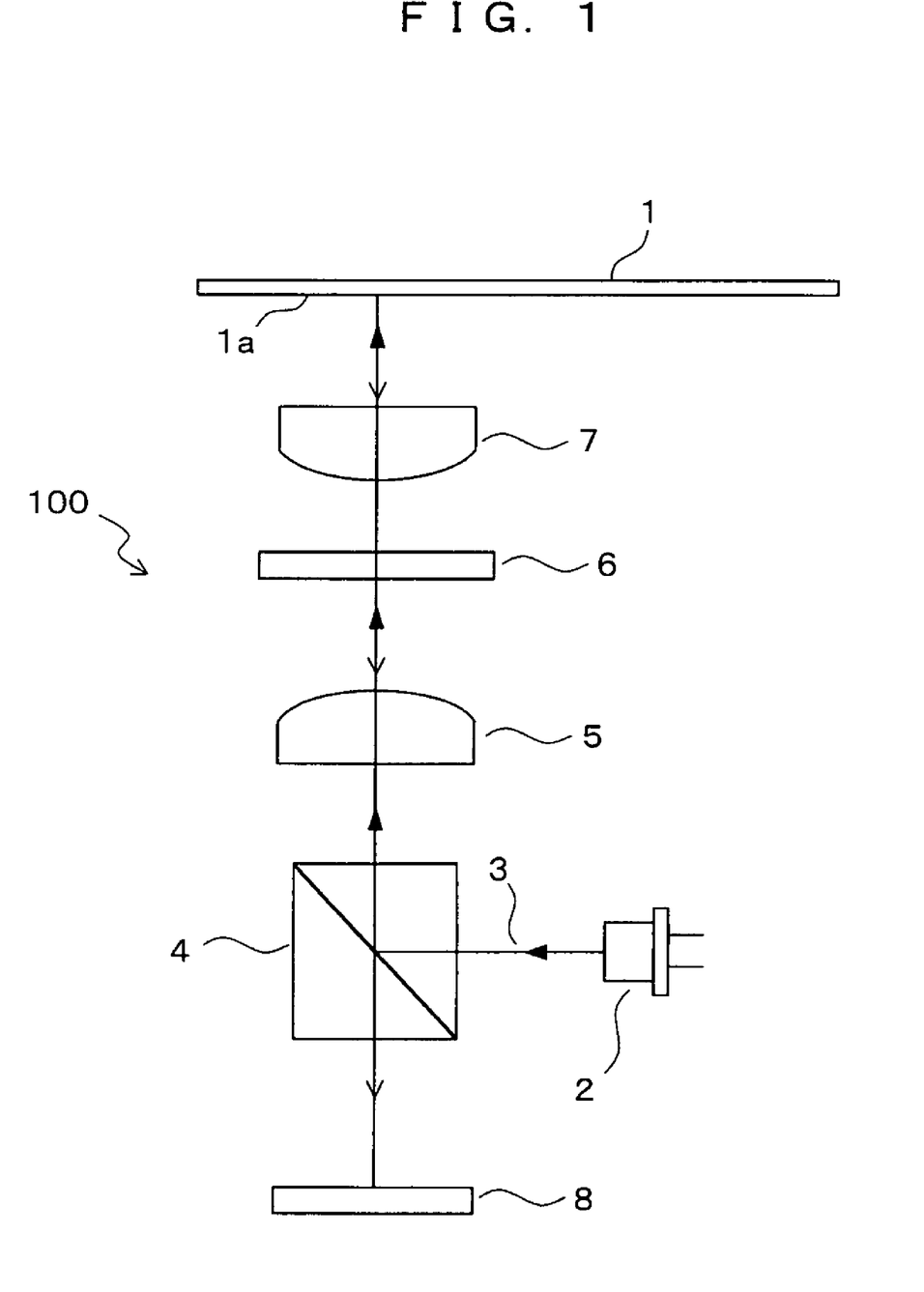
FIG. 1 is a schematic configuration view showing one example of an optical pickup.

The embodiment of the present invention will now be described with reference to the drawings. FIG. 1 is a schematic configuration view showing one example of an optical pickup used in the present invention. Reference numeral 1 is an optical disc such as CD and DVD, and reference numerals 2 to 8 are components configuring the optical pickup 100. Reference numeral 2 is a semiconductor laser as a light emitting element, 3 is laser light projected from the semiconductor laser 2, 4 is a half mirror for reflecting the laser light 3 at an angle of 90°, 5 is a collimator lens for converting the laser light 3 reflected by the half mirror 4 to parallel light, 6 is a light dividing element such as prism, hologram and the like, 7 is an objective lens for collecting the laser light 3 on the optical disc 1, and 8 is a light receiving unit for receiving the light reflected by the optical disc 1.

The laser light 3 projected from the semiconductor laser 2 is reflected by the half mirror 4 and converted to parallel light by the collimator lens 5, and thereafter, passed through the light dividing element 6 and the objective lens 7 to be collected at a disc surface (information recording surface) 1$a$ of the optical disc 1, thereby forming a microscopic optical spot. The light reflected by the disc surface 1$a$ is divided into plural lights by the light dividing element 6, and passed through the collimator lens 5 and the half mirror 4 and received by the light receiving unit 8.

FIG. 2 is a view showing a configuration of the light receiving unit 8. The light receiving unit 8 includes a light receiving part 10 (first light receiving part) for receiving zero-dimensional light of the lights divided by the light dividing element 6 and a light receiving part 11 (second light receiving part) for receiving + one-dimensional light of the lights divided by the light dividing element 6. The light receiving part 11 is arranged in the vicinity of the light receiving part 10, and is configured by four light receiving elements 11$a$ to 11$d$ that respectively receives four + one-dimensional light divided by the light dividing element 6. The light receiving elements 11$a$ to 11$d$ are arrayed in a direction (left and right direction in FIG. 2) parallel to the radial direction of the optical disc 1.

Each light receiving element 11$a$ to 11$d$ is configured by three light receiving cells divided in a direction (up and down direction in FIG. 2) orthogonal to the arraying direction. The light receiving cells A1 to A3 configure the light receiving element 11$a$, the light receiving cells B1 to B3 configure the light receiving element 11$b$, the light receiving cells C1 to C3 configure the light receiving element 11$c$, and the light receiving cells D1 to D3 configure the light receiving element 11$d$. The three light receiving cells in each light receiving element is made up of a light receiving cell (A2, B2, C2, D2) of wide width positioned at the middle, a light receiving cell (A1, B3, C1, D3) of wide width positioned on one side of the middle light receiving cell, and a light receiving cell (A3, B1, C3, D1) of narrow width positioned on the other side. Assuming the center of the light receiving part 10 is the origin O and the X-axis and the Y-axis are set as illustrated, the light receiving cells A2, B2, C2, D2 at the middle are lined on the X-axis. Therefore, each light receiving element 11$a$ to 11$d$ is arranged so as to be asymmetric with respect to the X-axis.

The arrangement relationship of the three light receiving cells in the adjacent light receiving elements (e.g., 11a and 11b) is reversed.

Figure 3:
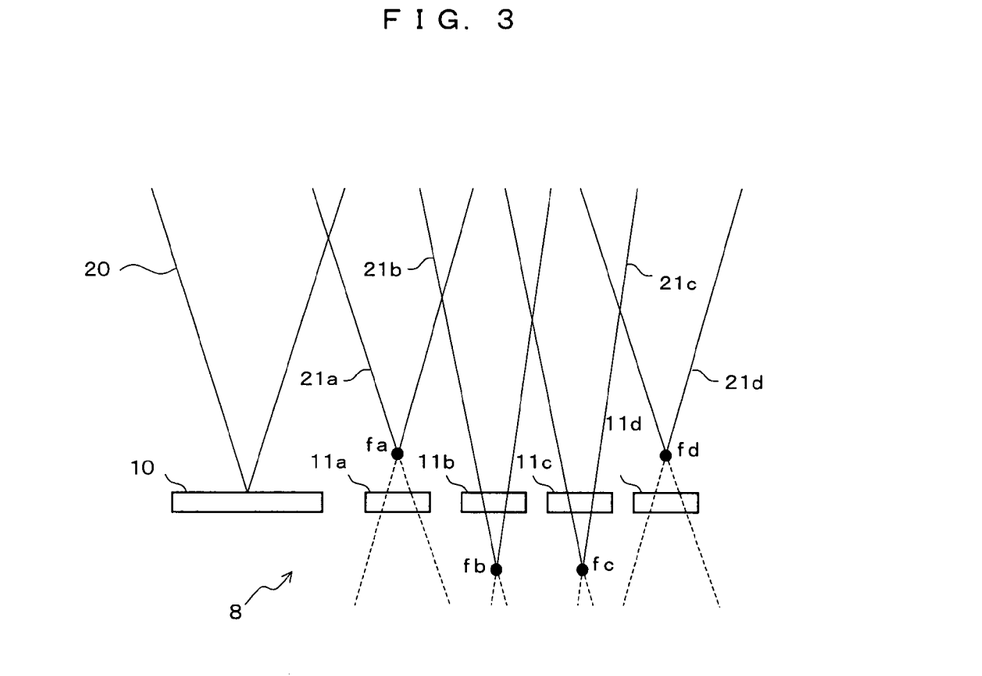
FIG. 3 is a view showing in frame format a light receiving state of zero-dimensional light and + one-dimensional light.

FIG. 3 is a view showing in frame format a light receiving state of the zero-dimensional light and the + one-dimensional light. Reference numeral 20 is the zero-dimensional light and reference numerals 21a to 21d are a light divided + one-dimensional light. The zero-dimensional light 20 is received by the light receiving part 10. The zero-dimensional light 20 is applied to read information recorded on the optical disc 1, where reproduction signal is generated based on an output signal from the light receiving part 10. The + one-dimensional lights 21a to 21d are respectively received by the light receiving elements 11a to 11d. In this case, the + one-dimensional lights 21a, 21d have the same focal length (first focal length), and respectively forms a focus fa, fd on a front side of the light receiving surface of the light receiving elements 11a, 11d. The + one-dimensional lights 21b, 21c have the same focal length (second focal length), and respectively forms a focus fb, fc on a rear side of the light receiving surface of the light receiving elements 11b, 11c. The + one-dimensional lights 21a to 21d are applied to detect focus error and tracking error, where a focus error signal and a tracking error signal are generated based on output signals from each light receiving cells of the light receiving elements 11a to 11d, and focus control and tracking control are performed based on the respective signal.

The light receiving elements 11a to 11d are divided into a first group and a second group. The pair of light receiving elements 11a, 11d that respectively receives the + one-dimensional light 21a, 21d forming the focus fa, fd on the front side of the light receiving surface belong to the first group. The pair of light receiving elements 11b, 11c that respectively receive the + one-dimensional light 21b, 21c forming the focus fb, fc on the rear side of the light receiving surface belong to the second group.

Figure 4:
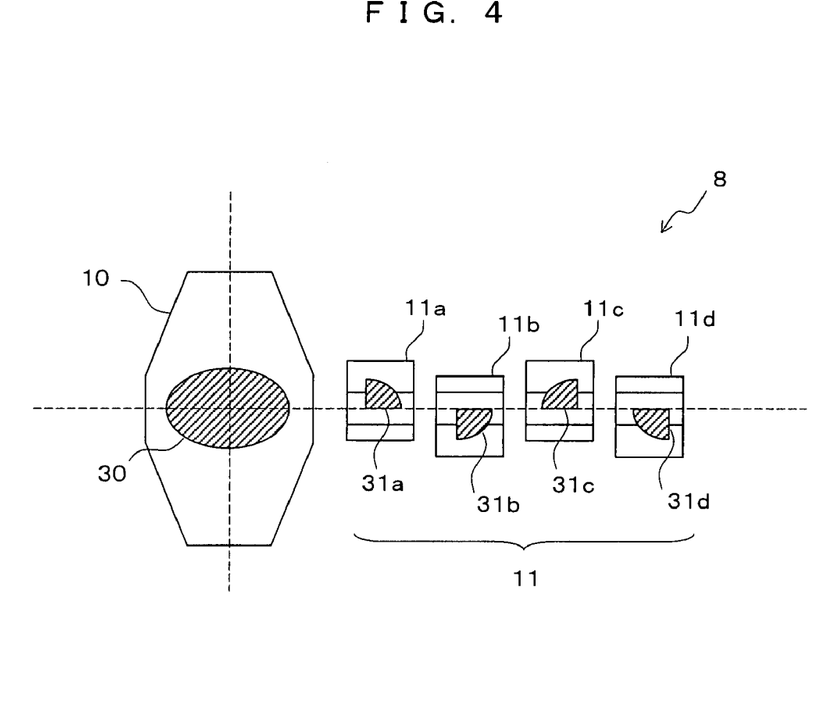
FIG. 4 is a view showing an example of an optical spot formed at the light receiving parts by the zero-dimensional light and the + one-dimensional light.

FIG. 4 shows an example of an optical spot formed at the light receiving unit 8 by the zero-dimensional light and the + one-dimensional light. The optical spot 30 is formed at the light receiving part 10 by the zero-dimensional light 20, and optical spots 31a to 31d are formed at the light receiving elements 11a to 11d by the + one-dimensional lights 21a to 21d. The optical spots 31a to 31d on the light receiving elements 11a to 11d are each formed into a fan shape by light division. As a consequence of the formation of the optical spots 31a to 31d at the light receiving part 11, the focus error signal S detected based on an output signal of the light receiving part 11 can be calculated by a following equation.

$$S=(A2+B1+B3+C1+C3+D2)-(A1+A3+B2+C2+D1+D3) \quad (1)$$

where A2, B1, B3, ... represent the outputs obtained from the corresponding light receiving cells A2, B1, B3, ... of FIG. 2.

Figure 5:
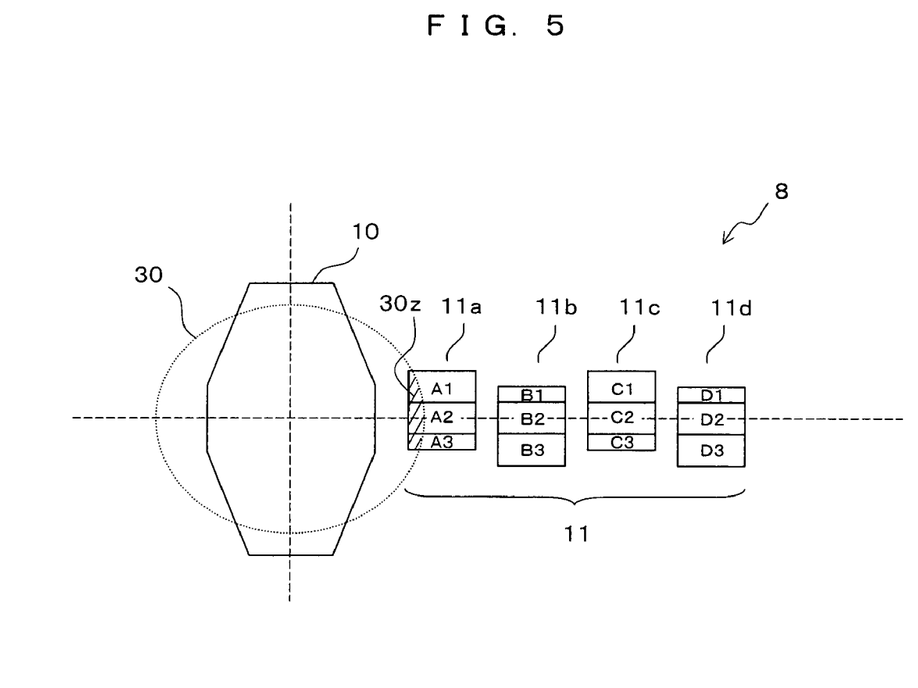
FIG. 5 is a view for describing leakage of the zero-dimensional light.

In the light receiving unit 8 configured as above, if the distance between the light receiving part 10 and the light receiving part 11 is short and thus the zero-dimensional light 20 is in a defocused (out-of-focus) state, the optical spot 30 of the zero-dimensional light is enlarged, as shown in FIG. 5, which causes a phenomenon in which the zero-dimensional light leaks into the light receiving element 11 as stray light 30z. Obviously, the light receiving element 11a closest to the light receiving part 10 is most likely to be influenced by the stray light 30z. If the stray light 30z leaks into the light receiving part 11 in such manner, offset is produced in an output signal of the light receiving element (light receiving element 11a in FIG. 5) to which the stray light leaked into, and as a result, the focus error signal S calculated by the above-mentioned equation (1) fluctuates.

Figure 7:
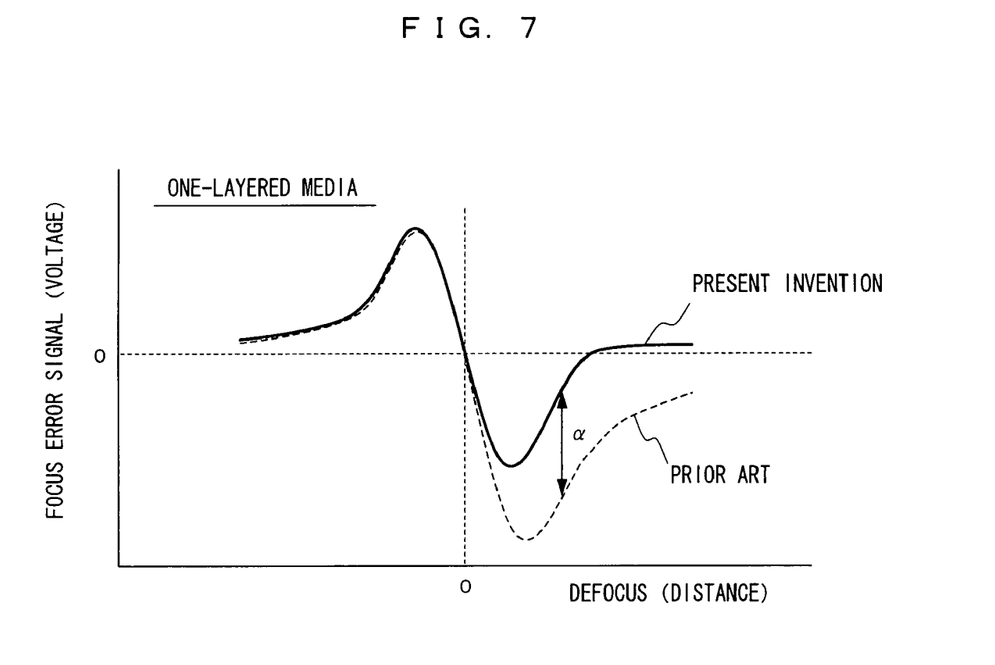
FIG. 7 is a view showing the characteristics of a focus error signal.
Figure 8:
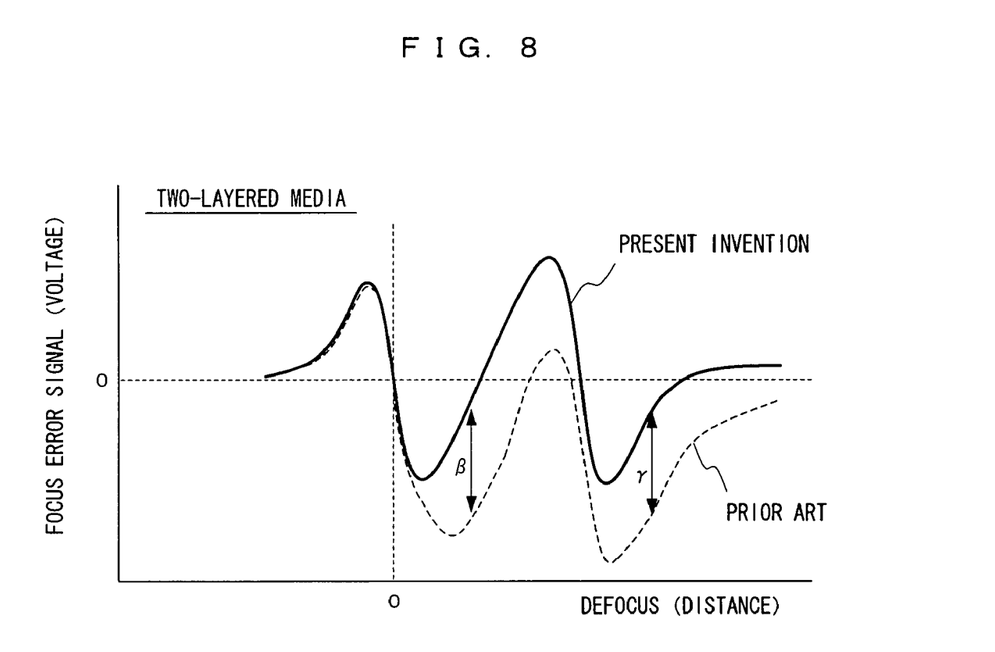
FIG. 8 is a view showing a circuit for correcting the focus error signal.

FIGS. 7 and 8 are views showing the characteristics (so-called S-characteristic) of the focus error signal. FIG. 7 shows a case of the optical disc with one recording layer, and FIG. 8 shows a case of the optical disc with two recording layers. If the stray light 30z leaks in, as described above, the focus error signal becomes as indicated by a broken line, and offsets $\alpha$, $\beta$, $\gamma$ are produced compared to the original signal indicated by a solid line. Thus, an accurate focus control cannot be performed.

In the present invention, the accurate focus control can be performed even if the stray light 30z leaks into the light receiving part 11 by correcting the focus error signal as described below. Assuming each output of the light receiving elements 11a, 11d belonging to the first group is Pa, Pd, Pa and Pd can be expressed as, $$Pa=A1+A2+A3 \quad (2)$$

$$Pd=D1+D2+D3 \quad (3)$$

Assuming each output of the light receiving elements 11b, 11c belonging to the second group is Pb, Pc, Pb and Pc can be expressed as, $$Pb=B1+B2+B3 \quad (4)$$

$$Pc=C1+C2+C3 \quad (5)$$

A correction value Q is calculated by the following equation using each output Pa to Pd.

$$Q=K_1(Pa-Pd)-K_2(Pb-Pc) \quad (6)$$

where $K_1$ and $K_2$ are positive constants defined by a shape of the light receiving elements 11a to 11d. In the present embodiment, $K_1=1$ and $K_2=1$. Therefore, equation (6) becomes, $$Q=(Pa-Pd)-(Pb-Pc) \quad (7)$$

In equation (6), the sign of $K_1$ is + and the sign of $K_2$ is − because outputs of the light receiving elements 11b, 11c of the second group have inverted polarity with respect to the outputs of the light receiving elements 11a, 11d of the first group.

The correction value Q obtained in this manner is added to the focus error signal S of equation (1) to correct the focus error signal S. The corrected focus error signal So becomes, $$So=S+Q \quad (8)$$

That is, in the present invention, the correction value Q is calculated based on the difference Pa−Pd in the outputs of the light receiving elements 11a, 11d belonging to the first group and the difference Pb−Pc in the outputs of the light receiving elements 11b, 11c belonging to the second group, and the focus error signal S is corrected using the correction value Q.

When the zero-dimensional light 20 leaks into the light receiving element 11a as stray light 30z as shown in FIG. 5, a difference is created in the outputs Pa, Pd of the light receiving element 11a and the light receiving element 11d forming a pair therewith, that is, the pair of light receiving elements 11a, 11d for receiving the one-dimensional light 21a, 21d having the same focal length. The difference Pa−Pd corresponds to the offset described above. In the case of FIG. 5, a difference is not created in the outputs Pb, PC of the light receiving elements 11b, 11c since such light receiving elements are not influenced by the stray light 30z, and thus Pb−Pc=0. Therefore, the correction value Q is the difference Pa−Pd in the outputs of the light receiving elements 11a, 11d, according to equation (7), which correction value Q is added to the focus error signal S so that the corrected focus error signal So does not contain offset. As a result, an ideal focus error signal as shown with a solid line in FIGS. 7 and 8 is obtained, and an accurate focus control is performed based on such signal.

In FIG. 5, a case where the stray light 30z leaks into only the light receiving element 11a has been described, but if the stray light 30z leaks into the light receiving element 11a and the light receiving element 11b, an output difference is created between the light receiving element 11b and the light receiving element 11c, whereby the correction value Q is given from the difference Pa−Pd in the outputs of the light receiving elements 11a, 11d and the difference Pb−Pc in the outputs of the light receiving elements 11b, 11c, which correction value Q is added to the focus error signal S to obtain the focus error signal without offset.

Figure 6:
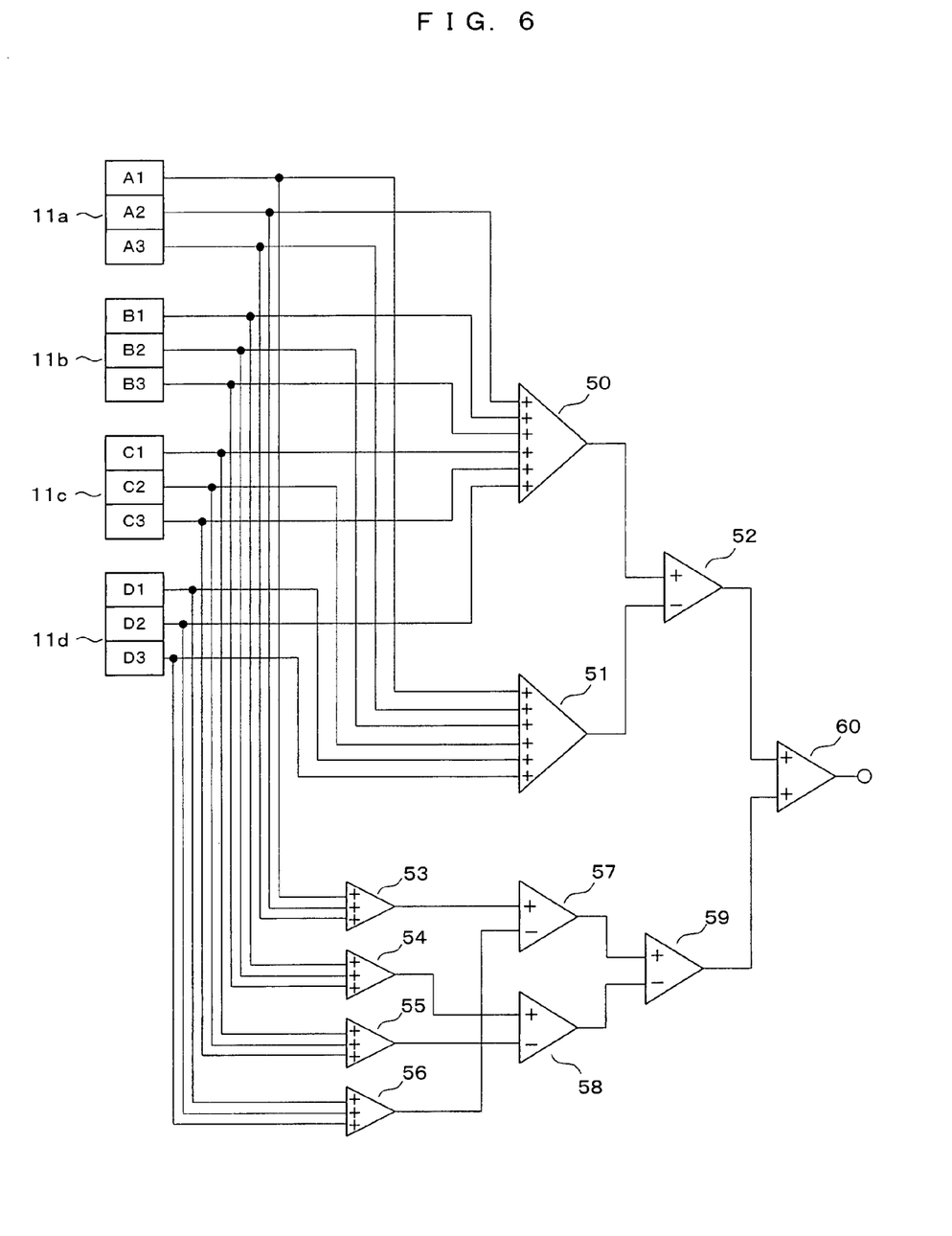
FIG. 6 is a view showing the characteristics of a focus error signal.

FIG. 6 shows a circuit for correcting the focus error signal described above. An adder circuit 50 for calculating the first bracket on the right side of equation (1) adds each output of A2, B1, B3, C1, C3 and D2 of the light receiving cells of the light receiving elements 11a to 11d. An adder circuit 51 for calculating the second bracket on the right side of equation (1) adds each output of A1, A3, B2, C2, D1 and D3 of the light receiving cells of the light receiving elements 11a to 11d. A subtraction circuit 52 subtracts the output of the adder circuit 51 from the output of the adder circuit 50, and calculates the focus error signal S of equation (1).

An adder circuit 53 for calculating Pa of equation (2) adds each output of the light receiving cells A1 to A3 of the light receiving element 11a. An adder circuit 54 for calculating Pb of equation (4) adds each output of the light receiving cells B1 to B3 of the light receiving element 11b. An adder circuit 55 for calculating Pc of equation (5) adds each output of the light receiving cells C1 to C3 of the light receiving element 11c. An adder circuit 56 for calculating Pd of equation (3) adds each output of the light receiving cells D1 to D3 of the light receiving element 11d. A subtraction circuit 57 for calculating the first bracket on the right side of equation (7) subtracts the output Pd of the adder circuit 56 from the output Pa of the adder circuit 53. A subtraction circuit 58 for calculating the second bracket on the right side of equation (7) subtracts the output Pc of the adder circuit 55 from the output Pb of the adder circuit 54. A subtraction circuit 59 subtracts the output Pb−Pc of the subtraction circuit 58 from the output Pa−Pd of the subtraction circuit 57 to calculate the correction value Q of equation (7).

An adder circuit 60 adds the correction value Q obtained in the subtraction circuit 59 to the focus error signal S obtained in the subtraction circuit 52 to calculate the corrected focus error signal So of equation (8).

In the circuit of FIG. 6, the light receiving elements 11a to 11d, the adder circuits 50, 51, and the subtraction circuit 52 configure a detection means for detecting the focus error signal. The adder circuits 53 to 56, the subtraction circuits 57 to 59, and the adder circuit 60 configure a correction means for correcting the focus error signal.

According to the embodiment described above, the light receiving element merely needs to be positioned only with respect to one of the one-dimensional lights since focus control and tracking control can be performed using only one of the ± one-dimensional lights, whereby variation in the detection signal caused by displacement of the light receiving element is alleviated and high accuracy servo control can be performed. Furthermore, since the light receiving region for detecting the stray light does not need to be arranged as described in aforesaid Japanese Laid-Open Patent Publication No. 7-134831, small optical pickup can be configured and cost can be reduced. When the zero-dimensional light 20 leaks into the light receiving part 11 as the stray light 30z, a difference is created between the outputs of the light receiving elements for receiving the + one-dimensional light having equal focal length, and thus the correction value Q is calculated based on such difference to correct the focus error signal S, whereby the offset can be easily removed. In this case, the difference in outputs of the first group including the light receiving element 11a that is the closest to the light receiving part 10 and thus is most likely to be influenced by the stray light 30z is always used, and thus the offset is more reliably removed. The accuracy of correction is further enhanced and high accuracy focus control can be performed by using the difference in outputs of the second group in addition to the first group. Moreover, the circuit for removing the offset can be configured only with the adder circuits and the subtraction circuits as shown in FIG. 6, and thus a complicating circuit does not need to be used and the circuit can be realized inexpensively.

In the above embodiment, the correction value is calculated based on the difference in the outputs of the light receiving elements 11a, 11d belonging to the first group and the difference in the outputs of the light receiving elements 11b, 11c belonging to the second group, but the correction value may be calculated based on only the difference in the outputs of the first group to which the light receiving element 11a closest to the light receiving part 10 belongs. Since the light receiving element 11a closest to the light receiving part 10 is influenced the most by the stray light 30z, as described above, most of the offset caused by the stray light 30z can be removed by using only the difference in the outputs of the first group including the light receiving element 11a. In this case, the adder circuits 54, 55 and the subtraction circuits 58, 59 may be omitted in the circuit of FIG. 6, so that the circuit configuration is simplified.

Figure 9:
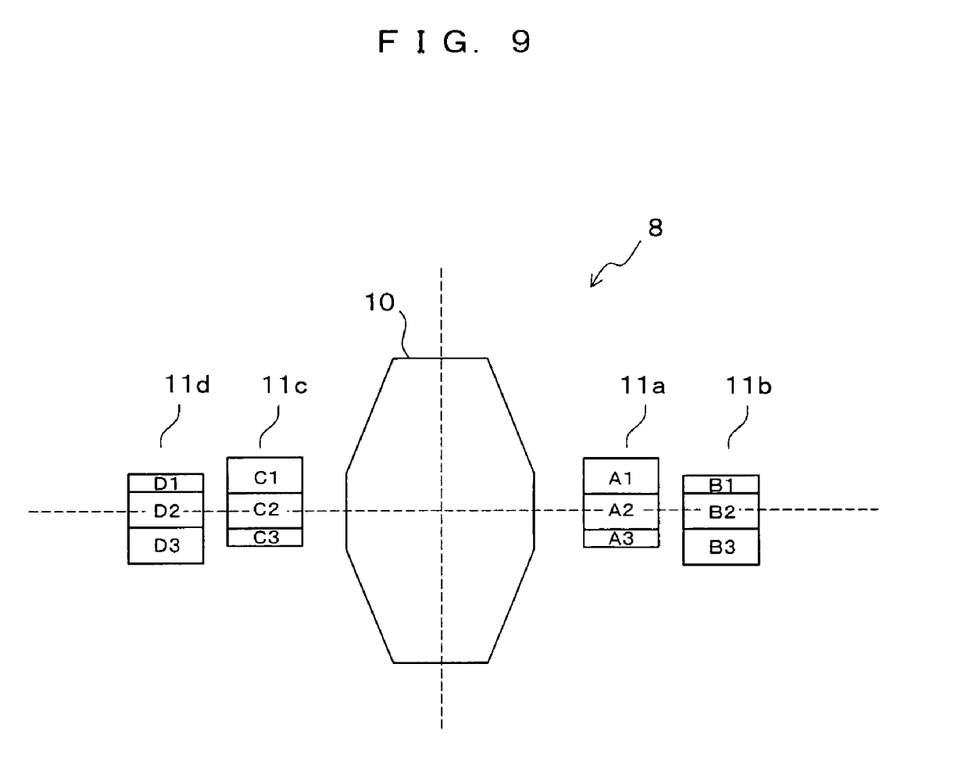
FIG. 9 is a view showing a configuration of the light receiving unit according to another embodiment.

In the embodiment described above, a case where four light receiving elements 11a to 11d for receiving the + one-dimensional light are arranged on one side (right side in FIG. 2) of the light receiving part 10 for receiving the zero-dimensional light 20, but the present invention is also applicable to a case where the light receiving elements 11a to 11d are arranged on both sides of the light receiving part 10 as shown in FIG. 9.

Furthermore, a case where the + one-dimension light is used has been described in the above embodiment, but the present invention is also applicable to a case where − one-dimensional light is used in place of the + one-dimensional light.

What is claimed is:

1. A device for correcting an output from an optical pickup including a light emitting element, an objective lens for collecting light projected from the light emitting element on an optical disc, and a light receiving unit for receiving the light reflected by the optical disc; the device comprising:

a light dividing element for dividing the light reflected by the optical disc;

a detection means for detecting a focus error signal based on an output of the light receiving unit; and a correction means for correcting the focus error signal detected in the detection means; wherein the light receiving unit includes a first light receiving part for receiving a zero-dimensional light divided by the light dividing element and a second light receiving part, arranged in the vicinity of the first light receiving part, for receiving a plurality of one-dimensional lights divided by the light dividing element;

the second light receiving part includes a plurality of light receiving elements arrayed in a direction parallel to a radial direction of the optical disc and respectively adapted to receive the a plurality of one-dimensional lights, the light receiving elements being divided into a plurality of groups, a pair of light receiving elements for receiving the one-dimensional light having a same focal length belonging to the same group;

each light receiving element is configured by a plurality of light receiving cells divided in a direction orthogonal to the arraying direction;

the detection means detects the focus error signal based on the output of the light receiving cells of each light receiving element; and the correction means calculates a correction value based on a difference in the outputs of the pair of light receiving elements belonging to at least one group, and corrects the focus error signal detected by the detection means based on the correction value.

2. The device for correcting the output of the optical pickup according to claim 1, wherein the correction means calculates the correction value based on a difference in outputs of the pair of light receiving elements belonging to a group including a light receiving element closest to the first light receiving part.

3. A device for correcting an output from an optical pickup including a light emitting element, an objective lens for collecting light projected from the light emitting element on an optical disc, and a light receiving unit for receiving the light reflected by the optical disc; the device comprising:

a light dividing element for dividing the light reflected by the optical disc;

a detection means for detecting a focus error signal based on an output of the light receiving unit; and a correction means for correcting the focus error signal detected in the detection means; wherein the light receiving unit includes a first light receiving part for receiving a zero-dimensional light divided by the light dividing element and a second light receiving part, arranged in the vicinity of the first light receiving part, for receiving four + one-dimensional lights divided by the light dividing element;

the second light receiving part includes four light receiving elements arrayed in a direction parallel to a radial direction of the optical disc and respectively adapted to receive the + one-dimensional light, the light receiving elements being divided into light receiving elements of a first group and light receiving elements of a second group, a pair of light receiving elements for receiving the + one-dimensional light having a first focal length belonging to the first group, and a pair of light receiving elements for receiving the + one-dimensional light having a second focal length belonging to the second group;

each light receiving element is configured by three light receiving cells divided in a direction orthogonal to the arraying direction;

the detection means detects the focus error signal based on the output of the light receiving cells of each light receiving element; and the correction means calculates a correction value based on a difference in the outputs of the pair of light receiving elements belonging to the first group and a difference in the outputs of the pair of light receiving elements belonging to the second group, and corrects the focus error signal detected by the detection means based on the correction value.

\* \* \* \* \*